United States Patent [19]

Maeno et al.

[11] Patent Number: 4,749,144
[45] Date of Patent: Jun. 7, 1988

[54] EMERGENCY LOCKING RETRACTOR FOR SEAT BELTS

[75] Inventors: Yoshihiro Maeno, Settsu; Kenjiro Matsumoto, Osaka, both of Japan

[73] Assignee: Ashimori Kogyo Kabushiki Kaisha, Osaka, Japan

[21] Appl. No.: 44,943

[22] PCT Filed: Jul. 22, 1986

[86] PCT No.: PCT/JP86/00389
§ 371 Date: Mar. 20, 1987
§ 102(e) Date: Mar. 20, 1987

[87] PCT Pub. No.: WO87/00491
PCT Pub. Date: Jan. 29, 1987

[30] Foreign Application Priority Data

Jul. 22, 1985 [JP] Japan .................. 60-113351

[51] Int. Cl.$^4$ .................. B60R 22/38; B60R 22/40
[52] U.S. Cl. .................. 242/107.4 A; 242/107.4 B
[58] Field of Search .................. 242/107.4 B, 107.4 A; 280/806; 297/478, 480

[56] References Cited

U.S. PATENT DOCUMENTS

| | | | |
|---|---|---|---|
| 4,453,681 | 6/1984 | Gueguen et al. | 242/107.4 B X |
| 4,461,434 | 7/1984 | Butenop | 242/107.4 B |
| 4,508,289 | 4/1985 | Singer et al. | 242/107.4 B |
| 4,526,328 | 7/1985 | Kilpatrick | 242/107.4 B X |

FOREIGN PATENT DOCUMENTS

59-67974 4/1984 Japan.
8203991 11/1982 PCT Int'l Appl. .......... 242/107.4 B Primary Examiner—John M. Jillions
Attorney, Agent, or Firm—Birch, Stewart, Kolasch & Birch

[57] ABSTRACT

An emergency locking retractor for seat belts comprises a spindle, a swing member loosely inserted into the spindle and having engaging teeth on the outer periphery thereof, a locking member having internal teeth engageable with the engaging teeth of the swing member, a synchrogear slidably rotatable with the spindle to engage the swing member with the locking member, and an acceleration sensing device engagable with the synchrogear. The swing member has a supporting tooth in addition to the engaging teeth, the synchrogear is provided with a balance weight for compensating deviation of the center of weight of the swing member from the rotation center of the spindle, and the spindle is provided with a reinforcing plate and further with projections integrally formed which are so positioned that the projected portions may be present on the upper surface of the swing member to prevent any upward movement of the swing member causing disengagement. The emergency locking retractor for seat belts is lightweight and simple in structure and has a locking mechanism operable with certainty in case of an emergency under any circumstance, thus being highly reliable.

5 Claims, 9 Drawing Sheets

EMERGENCY LOCKING RETRACTOR FOR SEAT BELTS

TECHNICAL FIELD

This invention relates to an emergency locking retractor for seat belts. This retractor has an improved cam mechanism which acts as a swing member. More particularly, this invention relates to a lightweight, highly reliable emergency locking retractor for seat belts which has a swing member provided with an inertial means for locking. The retractor is simple in structure and can operate with certainty.

DESCRIPTION OF THE BACKGROUND ART

A variety of retractors for seat belts have heretofore been proposed and put into practice. In recent years, emergency locking retractors (ELR) for seat belts have also been proposed. These emergency locking retractors are provided with a mechanism capable of locking a seat belt in case of emergency, e.g. when acceleration exceeds a threshold value. On the other hand, a number of reseaches and developments have been made in automobile industries for fuel economization, enhancement of running performance and keeping of a large interior space. For these studies, individual automobile parts are requested to be lightweight and compact.

Under such circumstances, emergency locking retractors for seat belts are also requested to be lightweight and compact so that a part of the metal parts used heretofore has been substituted with parts made of a synthetic resin to lighten the weight. For example, a metallic winding reel was made lightweight by a method wherein the reel was formed with a synthetic resin and the center of the reel was provided with a metallic reinforcing element. In recent years, emergency locking retractors for seat belts, which are compact as a whole and have a small number of parts have been developed and actually put into practice wherein a spindle having rectangular ends is used to swing a swing member mounted loosely outside the spindle and the swing member is engaged and locked with a locking means fixed to a housing. Emergency locking retractors having such structure are disclosed, for example, in Japanese Laid-open Patent Appln. No. Sho. 57-128170 (U.S. Pat. No. 4,508,289) and Japanese Laid-open Patent Appln. No. 58-94865 (U.S. Pat. No. 4,453,681).

However, the prior art emergency locking retractors disclosed in these publications are very complicated because the shape of a hole used in the swing member for loosely inserting the spindle must be precise as the swing of the swing member is controlled by such a complicated shape, thus making the manufacture of the emergency locking retractors troublesome and the function thereof less reliable. When the swing member is engaged with the locking member in these prior art retractors, the teeth of these members sometimes abut against each other at the top thereof and are not correctly engaged with each other. Under such condition, disengagement occurs when a strong force is exerted to a webbing, with the result that the webbing may significantly be pulled out and the emergency locking retractor function is then lost.

In the emergency locking mechanism of this type, the swing member must also be considered as a part of the inertial means. In these retractors wherein no consideration is paid to this problem, however, the center of gravity of the inertial means does not correspond to the rotation center of a webbing-winding shaft so that sensitivity of inertial locking may vary according to the location of the shaft in rotation, thus influencing the stability of performance. Further, the load capacity of these retractors varies according to whether the position of the longer edges of the spindle of the webbing-winding shaft are located parallel or vertical to the direction of load. When the longer edges are located in a position which is vertical to the direction of load, the bending strength of the spindle itself is weakened as well so that the locking member and the swing member may be disengaged by deformation such as twisting of a resinous portion in the winding shaft or wherein the load capacity is considerably reduced. In the retractors disclosed in Japanese Laid-open Patent Appln. No. Sho. 58-94865, the rotation of the winding shaft is restrained so that the swing member may be moved upward from the fixed position for engagement such that the danger of disengagement may result. Further, the shape and structure of a hole for accepting the spindle are too complicate for controlling the swing member so that the manufacture of the retractor is made troublesome and some problem arises in reliability of the function, as described above.

Even if the prior art emergency locking retractors for seat belts are made lightweight by the use of parts made of a synthetic resin, however, there is still room for improvement by avoiding the necessity for high precision in their manufacture, stabilizing inertial locking, by enhancing load capacity in the locking member and by simplifying the structure. Thus, there is a demand for developing a new emergency locking retractor for seat belts which overcomes these drawbacks.

SUMMARY OF THE INVENTION

Accordingly, it is an object of the present invention to provide an emergency locking retractor for seat belts which, in case of emergency, is capable of always being reliably engaged with the locking member regardless of the condition of the swing member to the locking member, so as to restrain the seat occupant effectively.

It is another object of the present invention to provide a highly reliable emergency locking retractor for seat belts which is prevented from any disengagement of the locking member, improved in load capacity and stabilized in inertial locking sensitivity.

It is still another object of the present invention to provide an emergency locking retractor for seat belts which has a lightweight, compact size and is simple in structure.

It is a further object of the present invention to provide an emergency locking retractor for seat belts which is easy and economical to manufacture.

Other objects, features, and advantages of the emergency locking retractor of this invention for seat belts will become more fully apparent from the following description.

DISCLOSURE OF THE INVENTION

According to the present invention, there is provided an emergency locking retractor for seat belts which comprises a housing, a winding shaft, a spindle having generally rectangular ends and integrally provided with the winding shaft, a swing member having engaging teeth on the outer periphery thereof through which the spindle has been inserted loosely, a locking member fixed to the housing and having internal teeth engageable with the engaging teeth and a supporting tooth of the swing member, a synchrogear frictionally movable with the spindle and rotatable against the spindle to engage the supporting tooth of the swing member with the internal teeth of the locking member, and an acceleration sensing device provided engageably with the external teeth of the synchrogear, characterized in that the swing member has engaging teeth on the outer periphery of one end in the direction of the longer edges of the spindle and a supporting tooth on the outer periphery of one end in the direction of the shorter edges of the spindle and is capable of freely swinging against the spindle in the direction of the longer edges thereof and also capable of swinging in the direction of the shorter edges thereof by rotating against the spindle, the engaging teeth and the supporting tooth being biassed at all times in the direction of disengaging from the locking member by a spring means, that the synchrogear has been fixed with a balance weight to compensate deviation of the center of gravity of the swing member to the rotation center of the winding shaft, that the spindle forms a pair of projections in the direction of its longer edges which are always positioned above the surface of the swing member, and that the winding shaft is provided on the side of the locking member with a reinforcing plate.

The emergency locking retractor of the present invention for seat belts has various features as compared with similar prior art products. One of the features resides in the structure of the swing member; it has a supporting tooth for assuring engagement of its engaging teeth with the internal teeth of the locking member. Another feature resides in the structure of the synchrogear, especially in fixation of a balance weight which makes the center of gravity of the swing member as a part of the inertial means to correspond with the center of the rotation axis of the winding shaft thereby stabilizing the sensitivity of inertial locking. Still another feature resides in the structure of the spindle wherein a pair of projections formed in the direction of the longer edges prevents disengagement of the swing member by its upward movement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

The present invention will now be explained in more detail with reference to the attached drawings. In all the drawings, the same reference numeral refers to the same part.

Figure 1:
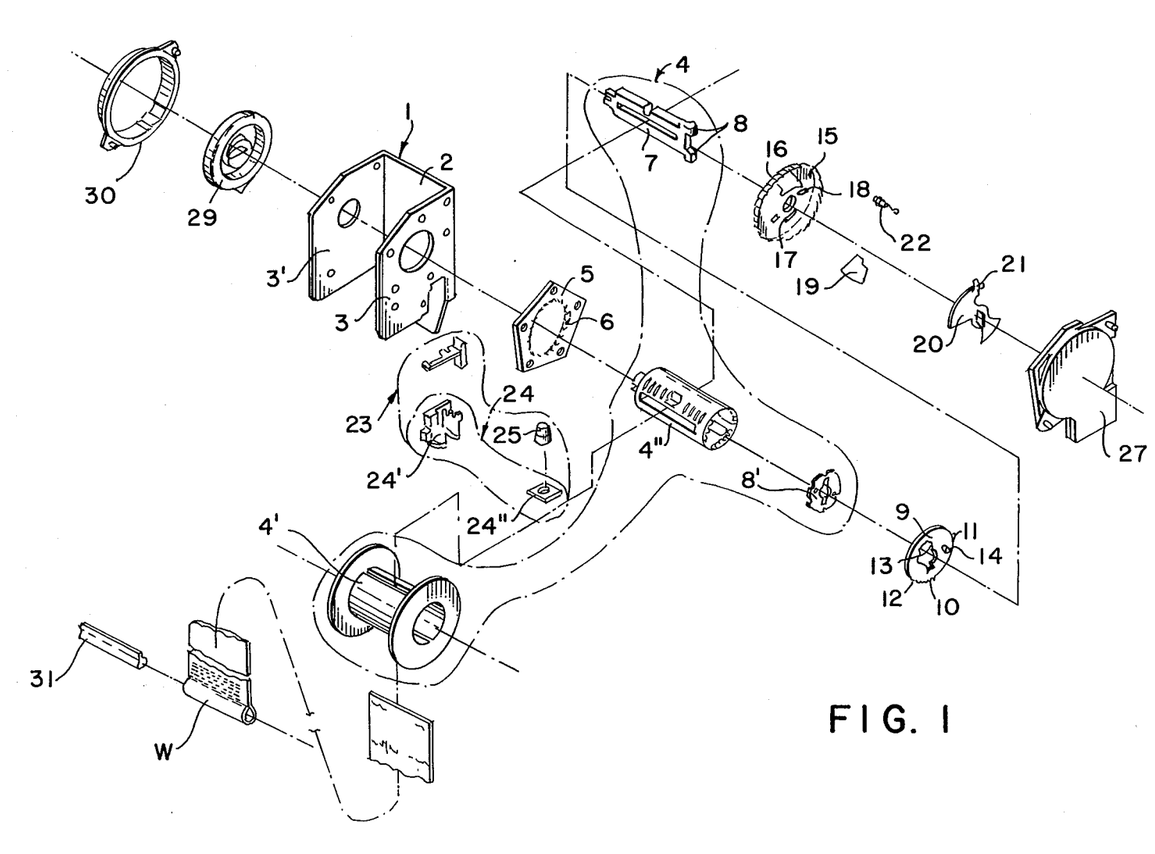
FIG. 1 is an exploded perspective view of an example of the emergency locking retractor of the present invention for seat belt, showing the characteristic construction of this invention together with a part of a webbing.
Figure 2:
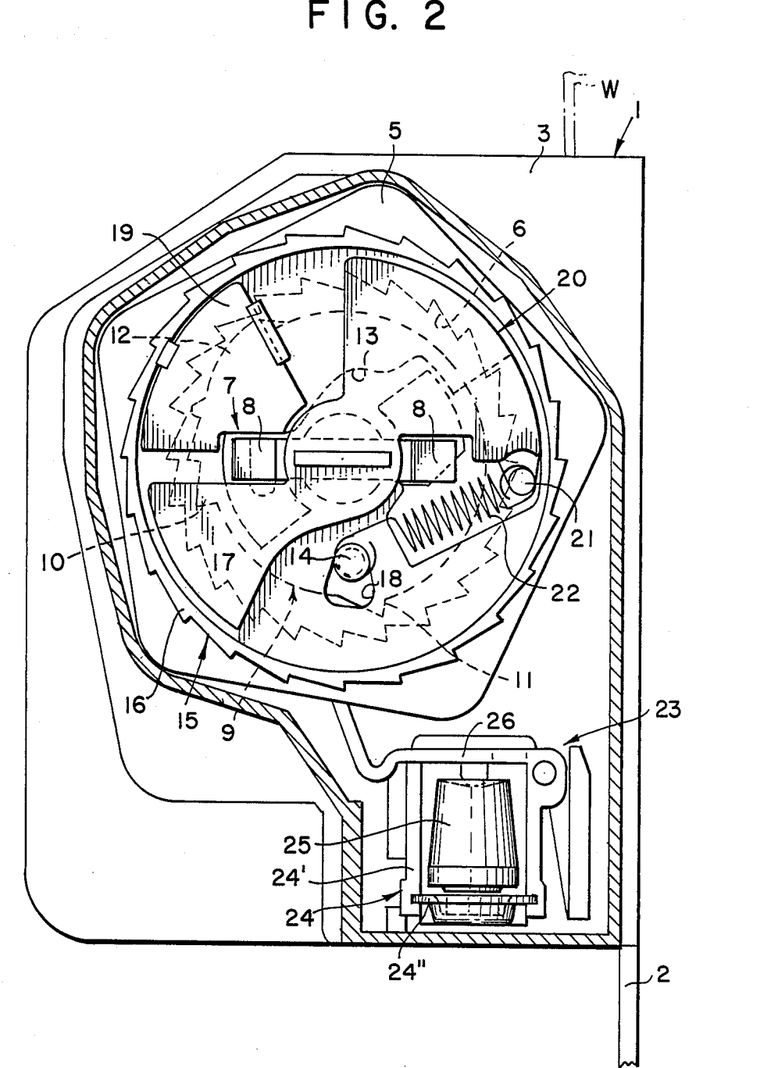
FIG. 2 is a side sectional view showing the main part of the emergency locking retractor for seat belts shown in FIG. 1.
Figure 3:
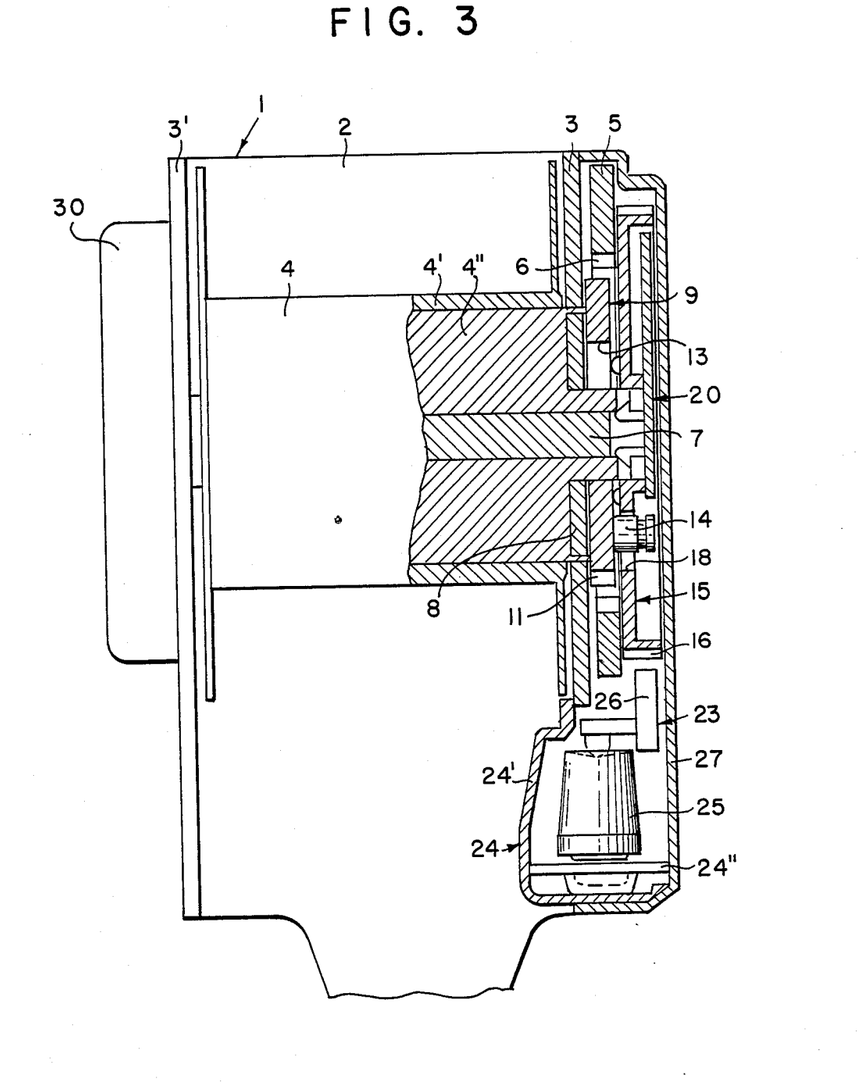
FIG. 3 is a vertical sectional view showing the main part of the emergency locking retractor for seat belts shown in FIG. 1.

In an example of the emergency locking retractor (which may be abbreviated as ELR) of the present invention shown in FIGS. 1-3, a housing 1 is constructed by a bottom plate 2 and side plates 3,3' disposed vertically on both edges of the bottom plate 2. Between these side plates 3,3' is bridged a webbing-winding shaft 4 which is provided on one end thereof with an emergency locking mechanism and on the other end thereof with a spring means 29 which imparts a webbing-winding force to the winding shaft 4. This spring means 29 is mounted to a cover 30 functioning also as a support therefor. In a hole in the central portion of the side plates 3 and 3' the winding shaft 4 is inserted. This winding shaft 4 is shown by a surrounding chain line and is constructed by a guide drum 4', a spindle case 4", a spindle 7 and a reinforcing plate 8'. The spindle case 4" is inserted into the guide drum 4' while the reinforcing plate 8' is disposed in a recess formed in one end of the spindle case 4" and also disposed in the spindle 7. In response to the demand for lightening the weight, it is advantageous to manufacture the spindle case 4" with a synthetic resin. The spindle 7 is inserted into the spindle case 4" through a hollow hole of a rectangular shape in cross section formed in the central portion of the spindle case 4". The spindle 7 extends outwardly at both ends from the spindle case 4" and is in a rectangular shape as a whole. As this spindle 7 is generally of a rectangular shape, it can be considered to have a longer side and a shorter side. Further, when viewed from an end of the spindle 7, this spindle may be considered to have a generally rectangular shape with two opposing edges which are longer than the remaining two opposing edges. The end of the spindle for the locking mechanism forms a pair of projections 8. The reinforcing plate 8' is positioned at around the portion where the spindle case 4' is supported by the side plate 3. A locking member 5 has internal teeth 6 on the inner periphery thereof and is fixed to the side plate 3 of the housing 1. A swing member 9 is loosely inserted through an insertion hole 13 into the spindle 7. In this swing member 9, engaging teeth 10 engageable with the internal teeth 6 of the locking member 5 are formed on the outer periphery of one end of the swing member 9 and are located in the direction of the longer edges in which the spindle 7 extend. Also, a supporting tooth 11 engageable also with the internal teeth 6 of the locking member 5 is formed on the outer periphery of one end of the swing member 9 and this tooth 11 is located in the direction in which the shorter edges of the spindle 7 extend. Further, an extended portion 12 is formed on the outer periphery of the swing member 9 adjacent to the engaging teeth 10.

The insertion hole 13 is elongated in the direction in which the longer edges of the spindle 7 extend and is enlarged at the side opposite the teeth 10 and opposite the supporting tooth 11 so that the swing member is capable of swinging against the spindle 7 in the direction of the longer edges thereof and also capable of swinging in the direction of the shorter edges thereof while engaging the edge of the insertion hole 13 when the spindle 7 is rotated against the swinging member 9. By the rotation of the spindle 7 against the swing member 9 in the counterclockwise direction as seen in the drawings, the projections 8 act to engage the insertion hole 13 whereby the swinging member 9 swings in the direction of the shorter edges of the spindle 7 to permit engagement of the supporting tooth 11 with the internal teeth 6. The swinging member 9 then swings in the direction of the longer edges of the spindle 7 to permit engagement of the engaging teeth 10 with the internal teeth 6. The engaging teeth 10 and the supporting tooth 11 are normally biassed always in the direction of disengagement with the internal teeth 6. The swing member 9 has on its side surface a projection 14 which is positioned in the neighborhood of the supporting tooth 11. A synchrogear 15 is mounted in such manner that it is frictionally movable with the spindle 7 and has external teeth 16 on the outer periphery thereof. In the synchrogear 15, a control hole 17 is formed into which the projections 8 of the spindle are inserted to restrict the movable range of the synchrogear 15 relative to the spindle 7. The synchrogear 15 is bored to form a guide hole 18 into which the projection 14 of the swing member 9 is inserted. This guide hole 18 is somewhat longer in the radial direction of the synchrogear 15 so that the projection 14 of the swing member can slidably move along the guide hole 18 to permit engagement or disengagement of the supporting tooth 11 with or from the internal teeth 6. A metal balance weight 19 is fixed to the synchrogear 15 in a position rear to the guide hole 18 in the direction of pulling out the webbing. A stopper 20 is fixed so as to rotate together with the spindle 7 and has on a part of the outer periphery thereof a projection 21 extending from the side. A spring means 22 extends between the projection 21 and the projection 14 of the swing member 9 to energize the swing member 9 so that the engaging teeth 10 and the supporting tooth 11 may be in a disengaged position from the internal teeth 6 of the locking member 5.

On the outside of the synchrogear 15, an acceleration sensing device 23 is provided adjacent to the external teeth 16. This acceleration sensing device 23 comprises a casing 24 constructed by a casing cover 24' and a bottom plate 24", a pendulum 25 placed inside the casing 24 and a swing piece 26 which is pivotally journaled at one end to the casing 24 and placed at the central part on the pendulum. As the front end of the swing piece 26 approaches the external teeth 16 of the synchrogear 15, the swing piece 26 is engageable with the external teeth 16 by swinging.

When a high level of acceleration is experienced, such as in an accident, sudden braking, etc., the pendulum 25 is swung to elevate the swing piece 26 and to allow it to swing whereby its front end is engaged with the external teeth 16 of the synchrogear 15 to stop its rotation. This acceleration sensing device 23 is not specifically limited in its structure. In actual use, anyone can select a suitable one from the known acceleration sensing devices.

A casing 27 covers all the emergency locking mechanism comprising the acceleration sensing device 23 equipped outside the side plate 3, the swing member 9, the synchrogear 15, the balance weight 19, the stopper 20, etc. and is fixed to the side plate 3. The guide drum 4' functions as a reel for a webbing W. The front end of the webbing to be wound on the guide drum 4' forms a closed loop around a pin 31 and is inserted into the spindle case 4" through a slit and is thereby fixed to the guide drum 4'.

The operation of the emergency locking retractor for seat belts will now be explained in detail.

Figure 4:
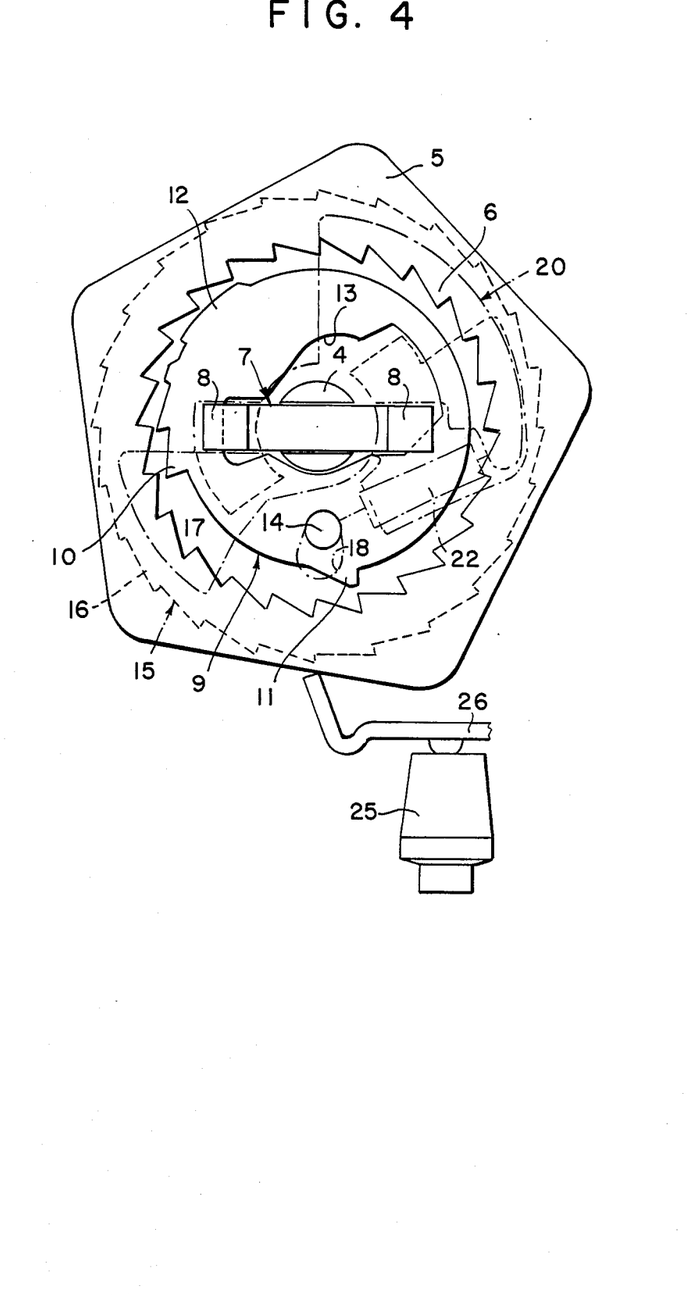
FIGS. 4-7 are illustrative drawings showing the process of operation of the emergency locking retractor for seat belts shown in FIG. 1.

FIG. 4 shows the emergency locking mechanism in a normal state of the emergency locking retractor shown in FIG. 1. In this state, the swing member 9 is maintained in the disengaged position to the locking member 5 by the resiliency of the spring means 22 so that the spindle 7, the swing member 9 and the synchrogear 15 can be rotated integrally to pull out or rewind the webbing W freely.

Figure 5:
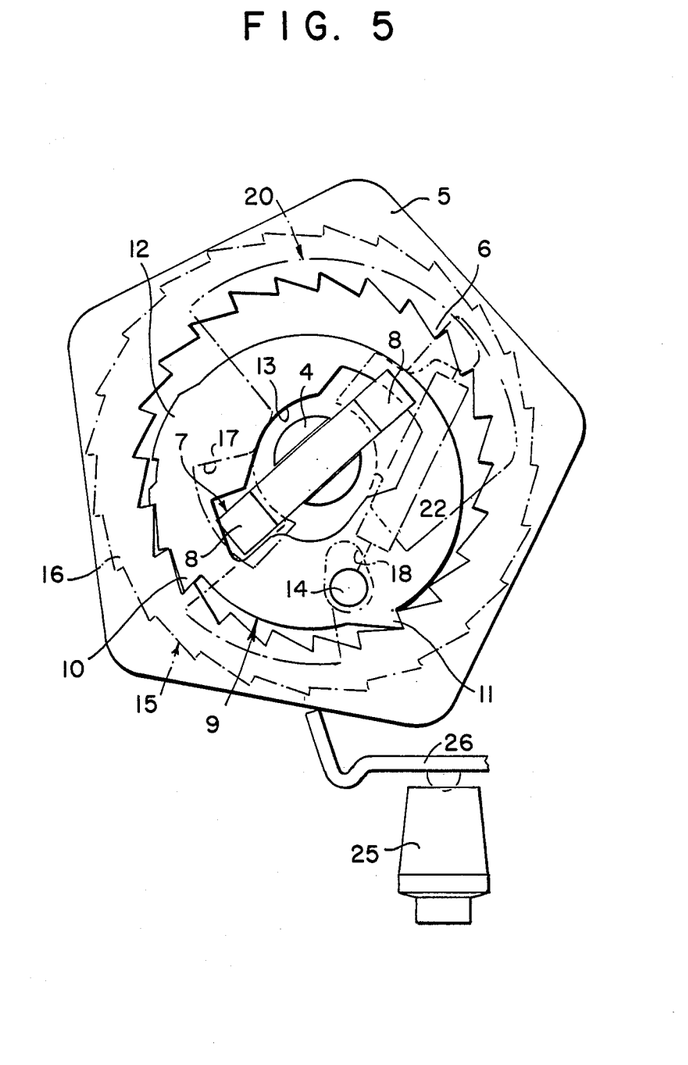

FIG. 5 shows the state of the emergency locking mechanism being actuated when the body of a seat belt wearer is moved to strongly pull out of the webbing W. In case the webbing W is strongly pulled out and the spindle 7 is thus rotated rapidly, the rotation of the swing member 9 is delayed by inertia relative to the spindle 7 so that the insertion hole 13 for the swing member 9 is contacted by the projections 8 of the spindle 7 whereby the swing member 9 is swung downwardly in the drawing against the resiliency of the spring means 22 to permit engagement of the supporting tooth 11 with the internal teeth 6. When the spindle 7 is rotated further in this state, the swing member 9 is then rotated in the counterclockwise direction with the supporting tooth 11 functioning as a fulcrum whereby the engaging teeth 10 are engaged with the internal teeth 6 to lock the retractor as shown in the drawing.

Figure 6:
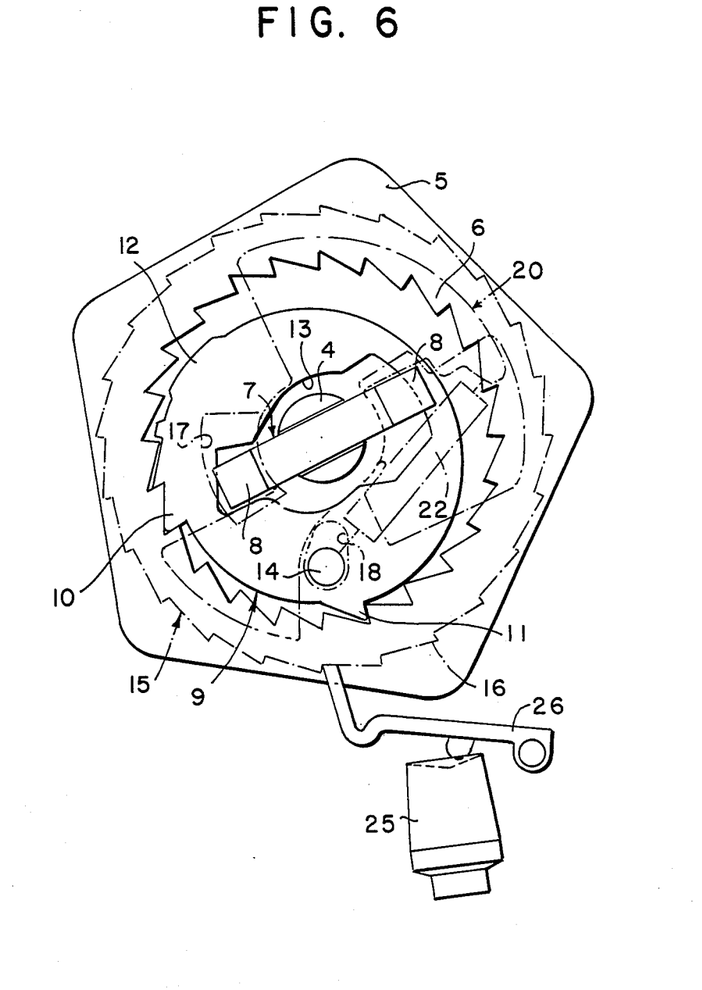

FIG. 6 shows the state of the emergency locking mechanism being actuated by the operation of the acceleration sensing device 23. In the event a strong acceleration is added to the emergency locking retractor for seat belts by any accident, sudden braking, etc., the pendulum 25 in the acceleration sensing device 23 is swung to elevate the swing piece 26 for initiation of the acceleration sensing device 23 whereby the tip of the swing piece 26 is engaged with the internal teeth 16 of the synchrogear 15 to stop its rotation.

In this state, a tension force is exerted to the webbing W and the spindle 7 is rotated in the counterclockwise direction in the drawing. In this case, the swing member 9 wherein the projection 14 has been inserted into the guide hole 18 of the synchrogear 15 cannot be rotated together with the spindle 7 whereby the insertion hole 13 is contacted by the projections 8 of the spindle 7 and the projection 14 is slidably moved along the guide hole 18 with the result that the swing member 9 is swung downward in the drawing to permit engagement of the supporting tooth 11 with the internal teeth 6 of the locking member 9. The swing member 9 is further swung, with the engaged point of the supporting tooth 11 and the internal teeth 6 functioning as a fulcrum, in the counterclockwise direction in the drawing against the resiliency of the spring means 22 whereby the engaging teeth 10 are engaged with the internal teeth 6 to lock the retractor as shown in the drawing.

In case of FIGS. 5 and 6 wherein the engaging teeth 10 of the swing member 9 are engaged with the internal teeth 6 of the locking member 5, the rotation of the spindle 7 is stopped in each case to make it impossible to pull out the webbing from the retractor.

In the retractors of this type, the winding shaft 4 is often disposed horizontally in the usual cases. Thus, the emergency locking device is disposed vertically and, in the case of the retractor of the present invention, a force in the downward direction is exerted on the swing member 9 by its own weight. In case the webbing W is suddenly pulled out, therefore, the supporting tooth 11 of the swing member 9 is relatively easily engaged by its own weight with the internal teeth 6 to facilitate locking of the retractor when the supporting tooth 11 is in the lower position. In case the supporting tooth 11 is in the upper position, however, locking of the retractor becomes relatively difficult because the swing member 9 has to be biassed against its own weight. In case of the emergency locking retractor of the present invention for seat belts wherein the synchrogear 15 is provided with the balance weight 19, however, the balance weight 19 is positioned to left side when the supporting tooth 11 is in the lower position so that a rotation force in the direction of pulling out the webbing is exerted to the synchrogear 15 by the self-weight of the balance weight 19. Accordingly, the guide hole 18 pushes the projection 14 lest the swing member 9 should be delayed in rotation from the spindle 7 whereby locking of the retractor by the engagement of the supporting tooth 11 with the internal teeth 6 is prevented.

On the contrary, when the supporting tooth 11 is positioned in the upper position, the balance weight 19 is positioned at the right side in the drawing so that a rotation force in the direction of winding the webbing is exerted to the synchrogear 15. Accordingly, the rotation of the synchrogear 15 tends to delay whereby it functions similarly to the case wherein the rotation of the synchrogear 15 is inhibited by the action of the acceleration sensing device 23 so that swing of the swing member 9 is promoted to engage the supporting tooth 11 with the internal teeth 6. Thus, the retractor can function at all times under the same condition irrespective of the position of the supporting tooth 11.

Figure 7:
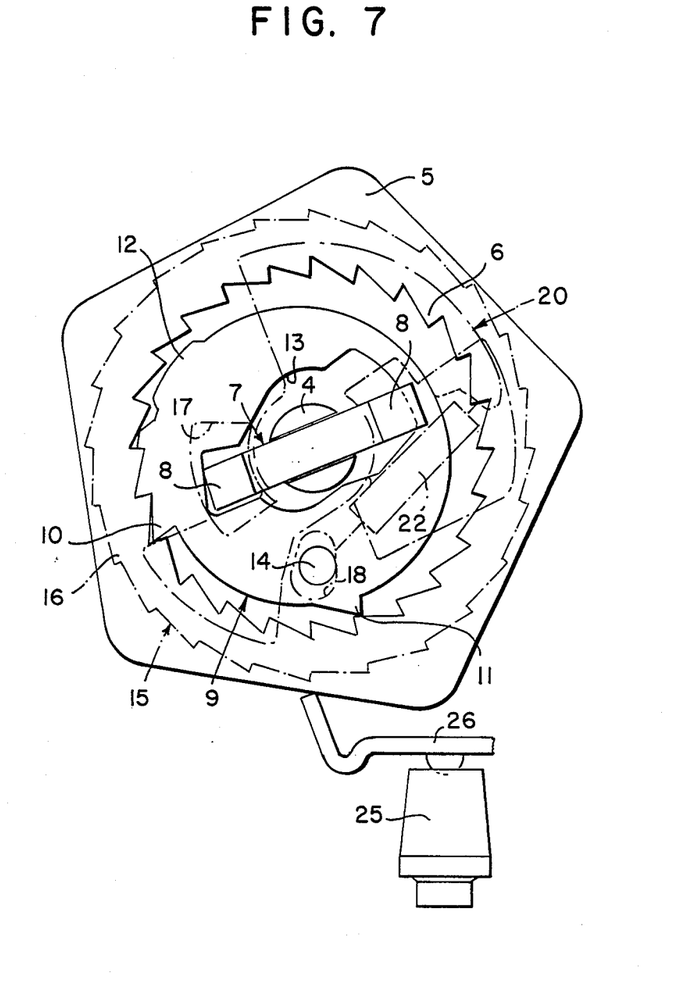

FIG. 7 shows the effect of the emergency locking retractor of the present invention for seat belts in such case that the engaging teeth 10 can be engaged with the internal teeth 6 even if the supporting tooth 11 is not correctly engaged with the inner teeth 6. In the retractor of the present invention, the locking mechanism proceeds in such manner that the supporting tooth 11 of the swing member 9 is initially engaged with the internal teeth 6 of the locking member 5 and, successively to this leading supporting tooth, the engaging teeth 10 of the swing member 9 are then engaged with the internal teeth 6. As seen in the prior art emergency locking retractors for seat belts, however, there may be the case wherein the supporting tooth 11 fails in some cases to engage correctly with the internal teeth 6, and the top of the supporting tooth 11 abuts against the top of any one of the internal teeth 6. In the retractor of the present invention, the swing member 9 is rotated in such case, with the abutting point between the supporting tooth 11 and the internal tooth 6 functioning as a fulcrum, in the counterclockwise direction. In this case, the engaging teeth 10 are correctly engaged with the internal teeth 6 to lock the retractor as shown in FIG. 7.

In case the swing member 9 is further engaged by the spindle 7 to effect rotation in such state, the engaging teeth 10 may be disengaged from the internal teeth 6. In the retractor of the present invention wherein the extending portion 12 is formed adjacent to the engaging teeth 10, however, the extending portion 12 abuts against the internal teeth 6 to suppport them so that any excessive rotation of the swing member 9 to cause disengagement of the engaging teeth 10 is prevented.

In the prior art emergency locking retractors, there may be a danger of disengagement of the engaging teeth 10 from the internal teeth 6 when the retractor is actuated to create a strong belt tension which causes temporary elastic deformation of the housing 1 and the winding shaft 4 whereupon the swing member 9 moves upward, as shown in FIGS. 5, 6 and 7. In an example of the retractor of the present invention as shown in FIG. 1, the projections 8 formed at the tip of the spindle 7 are always positioned above the surface of the swing member 9 and are engaged with the upper surface of the swing member 9 at the time of emergency locking thereby preventing the upward movement of the swing member 9. In the retractor of the present invention, a reinforcing plate 8' is mounted to a journal-supporting part of a side of the winding shaft 4 where the emergency locking mechanism is positioned, so that the winding shaft 4 is less deformed even if the spindle case 4" is made of a synthetic resin. In the emergency locking retractor of the present invention for seat belts, the swing member 9 is first swung in the direction of the shorter edges of the spindle 7 as described above to cause engagement or contact of the supporting tooth 11 with the internal teeth 6 in case of emergency, and thereafter the swing member 9 is rotated around the point of such engagement or contact as a fulcrum to cause engagement of the engaging teeth 10 with the internal teeth 6. It is assured therefore that the engaging teeth 10 are engaged with the internal teeth 6 to lock the retractor thereby entirely preventing the webbing from being pulled out, irrespective of the location the spindle 7 relative to the locking member 5 have. The operation is done very safely and with certainty. The retractor can be maintained in a locked state with certainty since the upward movement of the swing member 9 can be prevented, as described above, by the projections 8 of the spindle 7 even when the tension force of the seat belt becomes stronger in case of locking. Moreover, the load capacity of the retractor in case of the spindle 7 being positioned rectangularly to the direction of load can be improved significantly as the reinforcing plate 8' prevents any deformation of the winding shaft 4. As the shape of the insertion hole 13 in the swing member 9 is simple and the function of the insertion hole is only to swing the swing member 9 in case of being engaged and moved by the spindle 7, any specially high level of precision is not required for the manufacture of the swing member, thus making this economically advantageous. As the balance weight 19 eliminates the influence of the self-weight of the swing member 9, the condition for locking the retractor is not influenced by the location of the swing member 9. The retractor is operated always under a definite condition and is very safe in this respect.

Figure 8:
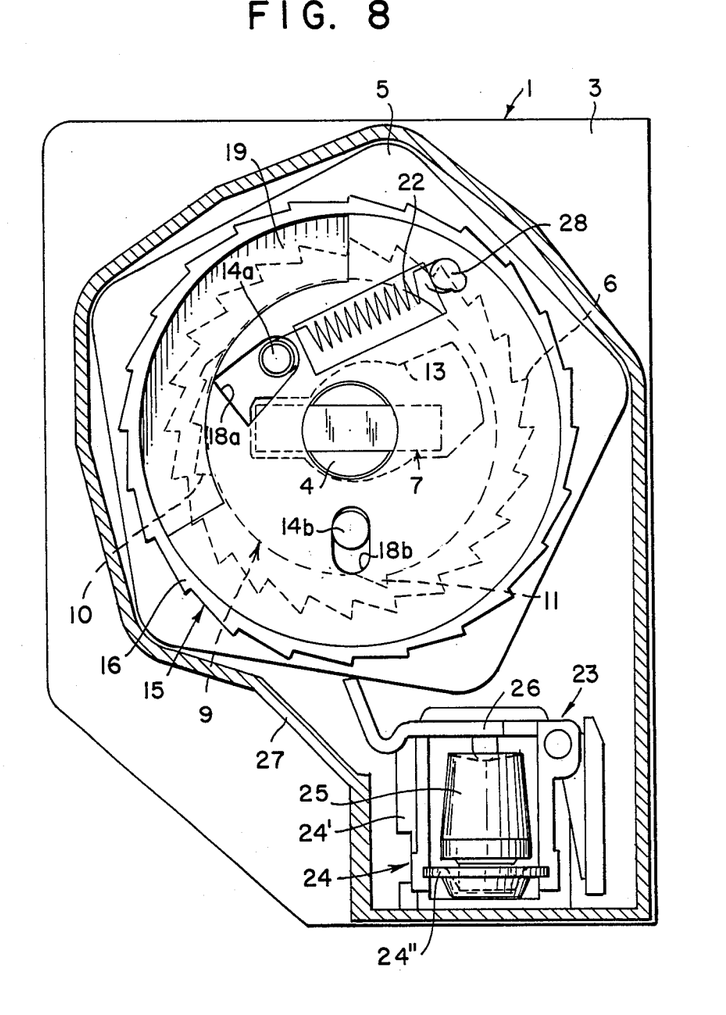
FIG. 8 is a side sectional view showing another example of the emergency locking retractor of this invention for seat belts.

FIG. 8 is a side sectional view showing another example of the emergency locking retractor of the present invention for seat belts. In this example, two projections 14a and 14b are formed in the swing member 9 and are inserted into two guide holes 18a and 18b formed in the synchrogear 15 which is slidably movable with the winding shaft 4. The stopper 20 is omitted and the spring means 22 is placed between the projection 14a and a projection 28 formed in the synchrogear 15. The projection 14a is positioned in the neighborhood of the engaging teeth 10 while the guide hole 18a into which the projection 14a is to be inserted is somewhat elongated in the peripheral direction of the synchrogear 15 so that the engaging teeth 10 may be engaged with the internal teeth 6 by sliding the projection 14a along the guide hole 18a. The other projection 14b is positioned in the neighborhood of the supporting tooth 11 while the guide hole 18b is elongated in the radial direction of the synchrogear 15.

Figure 9:
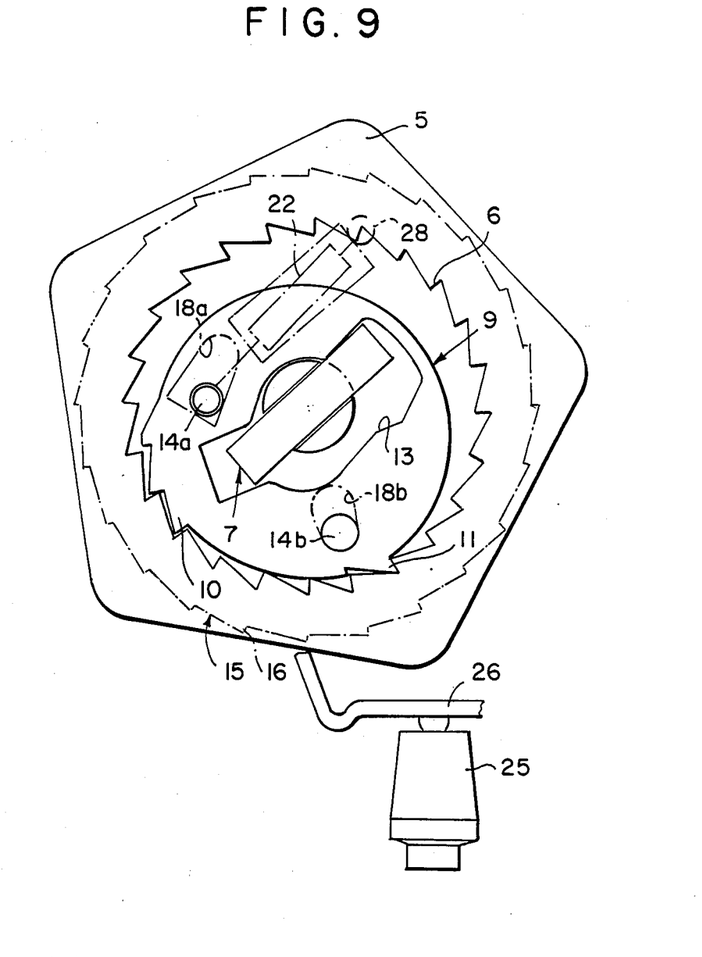
FIG. 9 is an illustrative drawing showing the locked state of the emergency locking retractor for seat belts shown in FIG. 8.

FIG. 9 is an illustrative drawing showing the locked state of the retractor shown in FIG. 8. When the webbing is strongly pulled out and the rotation of the swing member 9 is delayed or the swing piece 26 is engaged with the synchrogear 15 to stop the rotation of the synchrogear 15, the insertion hole 13 is contacted by the spindle 7 whereby the projection 14b is slid along the guide hole 18b to swing the swing member 9 downward for engaging the supporting tooth 11 with the internal teeth 6. The swing member 9 is further swung in the counterclockwise direction around the engaged position of the supporting tooth 11 and the internal teeth 6 as a fulcrum whereby the projection 14a is slided along the guide hole 18a against the resiliency of the spring means 22 to permit engagement of the engaging teeth 10 with the internal teeth 6. Even when the top of the supporting tooth 11 is contacted with the top of an internal tooth 6, the operation proceeds in the same manner as shown in FIG. 7 whereby the engaging teeth 10 are engaged with the internal teeth 6.

The emergency locking retractor of the present invention for seat belts having an improved emergency locking mechanism is actuated with certainty in any of the cases and is lightweight and simple in structure. Further, the retractor is easily manufactured and succeeds in overcoming all the drawbacks of the similar prior art retractors. Thus, the retractor is especially useful in the industrial field of transportation including motor vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An emergency locking retractor for seat belts comprising:
   a housing;
   a winding shaft located in said housing;
   a spindle integrally provided with said winding shaft, said spindle having substantially rectangular ends with opposing longer edges extending in a first direction and opposing shorter edges extending in a second direction;
   a swing member for receiving a portion of said spindle, said swing member having engaging teeth and a supporting tooth on the outer periphery thereof, said engaging teeth being positioned on a side of said outer periphery in the first direction, said supporting tooth being positioned on a side of said outer periphery in the second direction, said swing member being capable of freely swinging against said spindle by moving in said first direction, said swing member further being capable of freely swinging against said spindle by moving in said second direction;
   a lock member fixed to said housing and having internal teeth engageable with said engaging teeth and said supporting tooth of said swing member;
   a synchrogear having external teeth and being frictionally movable with said spindle and rotatable against said spindle by inertia to engage the supporting tooth of the swing member with the internal teeth of the lock member;
   an acceleration sensing device for engaging with the external teeth of the synchrogear; and
   spring means for biasing at all times said engaging teeth and said supporting tooth in a direction of disengagement from said lock member.

2. The emergency locking retractor for seat belts according to claim 1, wherein the swing member is provided with an extending portion adjacent to the engaging teeth.

3. The emergency locking retractor for seat belts according to claim 1, wherein the synchrogear has been fixed with a balance weight to compensate for deviations of the center of gravity of the swing member to the rotation center of the winding shaft.

4. The emergency locking retractor for seat belts according to claim 1, wherein one end of the spindle extend in the direction of the longer edges to form projections which are positioned above the surface of the swing member to prevent any upward movement of the swing member in case of locking.

5. The emergency locking retractor for seat belts according to claim 1, wherein one end of the winding shaft in which the lock member is positioned is provided with a reinforcing plate.

* * * * *